United States Patent
Wood

(10) Patent No.: US 11,897,114 B1
(45) Date of Patent: Feb. 13, 2024

(54) ACCESSORY STORAGE LOCATION FOR POWER TOOL

(71) Applicant: TECHTRONIC CORDLESS GP, Anderson, SC (US)

(72) Inventor: Grant A. Wood, Greenville, SC (US)

(73) Assignee: Techtronic Cordless GP, Anderson, SC (US)

(*) Notice: Subject to any disclaimer, the term of this patent is extended or adjusted under 35 U.S.C. 154(b) by 0 days.

(21) Appl. No.: 17/820,123

(22) Filed: Aug. 16, 2022

(51) Int. Cl.
  *B25F 5/00* (2006.01)
  *B25F 5/02* (2006.01)
  *H01M 50/247* (2021.01)

(52) U.S. Cl.
  CPC ........... B25F 5/029 (2013.01); H01M 50/247 (2021.01); *H01M 2220/30* (2013.01)

(58) Field of Classification Search
  CPC ....... B23D 47/00; B25F 5/029; H01M 50/247
  See application file for complete search history.

(56) References Cited

U.S. PATENT DOCUMENTS

| | | | |
|---|---|---|---|
| 4,932,294 A * | 6/1990 | Chang | B25F 5/02 81/177.4 |
| 5,029,706 A | 7/1991 | McCracken | |
| 5,121,803 A * | 6/1992 | Hartmann | B25F 5/029 173/171 |
| 5,810,525 A * | 9/1998 | Ector, Sr. | B25F 5/029 81/177.4 |
| 5,813,805 A | 9/1998 | Kopras | |
| 6,048,260 A | 4/2000 | Kopras | |
| 6,189,217 B1 * | 2/2001 | Melvin | B23D 51/03 81/177.4 |
| 6,443,675 B1 | 9/2002 | Kopras et al. | |
| 6,443,676 B1 | 9/2002 | Kopras | |
| D475,908 S | 6/2003 | Boyer | |
| D479,968 S | 9/2003 | McDonald et al. | |
| 6,725,892 B2 | 4/2004 | McDonald et al. | |
| 6,754,935 B2 | 6/2004 | Pozgay et al. | |
| 6,854,938 B2 | 2/2005 | Kopras et al. | |
| 6,889,439 B2 * | 5/2005 | Koukal | B25F 5/029 30/388 |
| 6,890,135 B2 | 5/2005 | Kopras et al. | |
| 6,902,356 B2 * | 6/2005 | Breitenmoser | B25F 5/029 81/177.4 |
| 6,951,232 B2 | 10/2005 | McDonald et al. | |
| 6,991,008 B2 | 1/2006 | McDonald et al. | |
| 7,094,011 B2 | 8/2006 | Kopras et al. | |

(Continued)

FOREIGN PATENT DOCUMENTS

| | | |
|---|---|---|
| DE | 2849871 A1 | 5/1980 |
| EP | 2881228 B1 | 3/2017 |

(Continued)

*Primary Examiner* — Eyamindae C Jallow
(74) *Attorney, Agent, or Firm* — Michael Best & Friedrich LLP

(57) ABSTRACT

A power tool including a housing. The housing supports a motor operably coupled to an output shaft. The housing includes a handle and a battery receptacle. The handle supports an actuator. The battery receptacle is disposed adjacent to the handle and is configured to receive a battery pack. The handle defines a storage space configured to support a tool accessory. The storage space is enclosed by the battery pack when the battery pack is coupled to the battery receptacle.

18 Claims, 9 Drawing Sheets

(56) References Cited

U.S. PATENT DOCUMENTS

| | | |
|---|---|---|
| 7,131,180 B2 | 11/2006 | Kopras et al. |
| 7,207,362 B2 | 4/2007 | McDonald et al. |
| RE40,304 E | 5/2008 | Kopras et al. |
| 7,370,679 B2 | 5/2008 | McDonald et al. |
| 7,523,772 B2 | 4/2009 | McDonald et al. |
| 7,556,070 B2 | 7/2009 | McDonald et al. |
| 7,600,579 B2 | 10/2009 | Wasielewski |
| 7,669,620 B2 | 3/2010 | McDonald et al. |
| 7,677,280 B2 | 3/2010 | McDonald et al. |
| 7,854,054 B2 | 12/2010 | Kopras et al. |
| 8,087,437 B2 | 1/2012 | Goddard et al. |
| 9,333,638 B2 | 5/2016 | Powell et al. |
| 9,339,938 B2 | 5/2016 | Winkel et al. |
| 9,656,380 B2 | 5/2017 | Monroy et al. |
| 9,757,868 B2 | 9/2017 | Winkel et al. |
| 9,975,233 B2 | 5/2018 | Powell |
| 2002/0197123 A1 | 12/2002 | Kopras et al. |
| 2003/0159843 A1* | 8/2003 | Sakai ..................... B25F 5/029 173/217 |
| 2003/0206779 A1 | 11/2003 | Kopras et al. |
| 2003/0228833 A1 | 12/2003 | Boyer |
| 2005/0069391 A1* | 3/2005 | Dils ......................... G01V 3/15 408/16 |
| 2006/0048959 A1* | 3/2006 | Sakai ..................... B25F 5/029 173/217 |
| 2007/0056168 A1 | 3/2007 | Mclaughlin |
| 2009/0014194 A1* | 1/2009 | Sakai ..................... B25F 5/029 173/217 |
| 2010/0180715 A1 | 7/2010 | Valentini |
| 2011/0167651 A1* | 7/2011 | Tokunaga .............. B23D 47/12 30/388 |
| 2014/0283932 A1 | 9/2014 | Hua et al. |
| 2018/0133886 A1* | 5/2018 | Hill ...................... B23D 49/162 |
| 2018/0154509 A1* | 6/2018 | Sergyeyenko .......... B25F 5/029 |

FOREIGN PATENT DOCUMENTS

| | | |
|---|---|---|
| EP | 2881229 B1 | 5/2019 |
| GB | 2588832 A1 | 5/2021 |
| WO | 2021260001 A1 | 12/2021 |

* cited by examiner

ACCESSORY STORAGE LOCATION FOR POWER TOOL

FIELD

The present disclosure relates to accessories for power tools, and more specifically, accessory storage locations for power tools.

BACKGROUND

Power tools may use accessory tools to perform maintenance on various components of the power tool. For example, accessory tools such as wrenches, screwdrivers, and the like may be utilized to perform maintenance on power tools. Said accessory tools may be provided separately from the power tool.

SUMMARY

In one aspect, the disclosure provides a power tool including a housing. The housing supports a motor operably coupled to an output shaft. The housing includes a handle and a battery receptacle. The handle supports an actuator. The battery receptacle is disposed adjacent to the handle and is configured to receive a battery pack. The handle defines a storage space configured to support a tool accessory. The storage space is enclosed by the battery pack when the battery pack is coupled to the battery receptacle.

In another aspect, the disclosure provides a power tool including a housing. The housing supports a motor operably coupled to an output shaft. The housing includes a handle and a battery receptacle. The handle has a first end and a rearward end. The battery receptacle is disposed adjacent to the rearward end of the handle. The handle defines a storage space accessible from the rearward end and configured to support a tool accessory. The battery receptacle at least partially defines an opening of the storage space.

In yet another aspect, the disclosure provides a power tool including a housing. The housing supports a motor operably coupled to an output shaft. The housing includes a handle. The handle defines an internal storage space accessible from an end of the handle. The handle is configured to support a tool accessory in the internal storage space.

DETAILED DESCRIPTION

Figure 1:
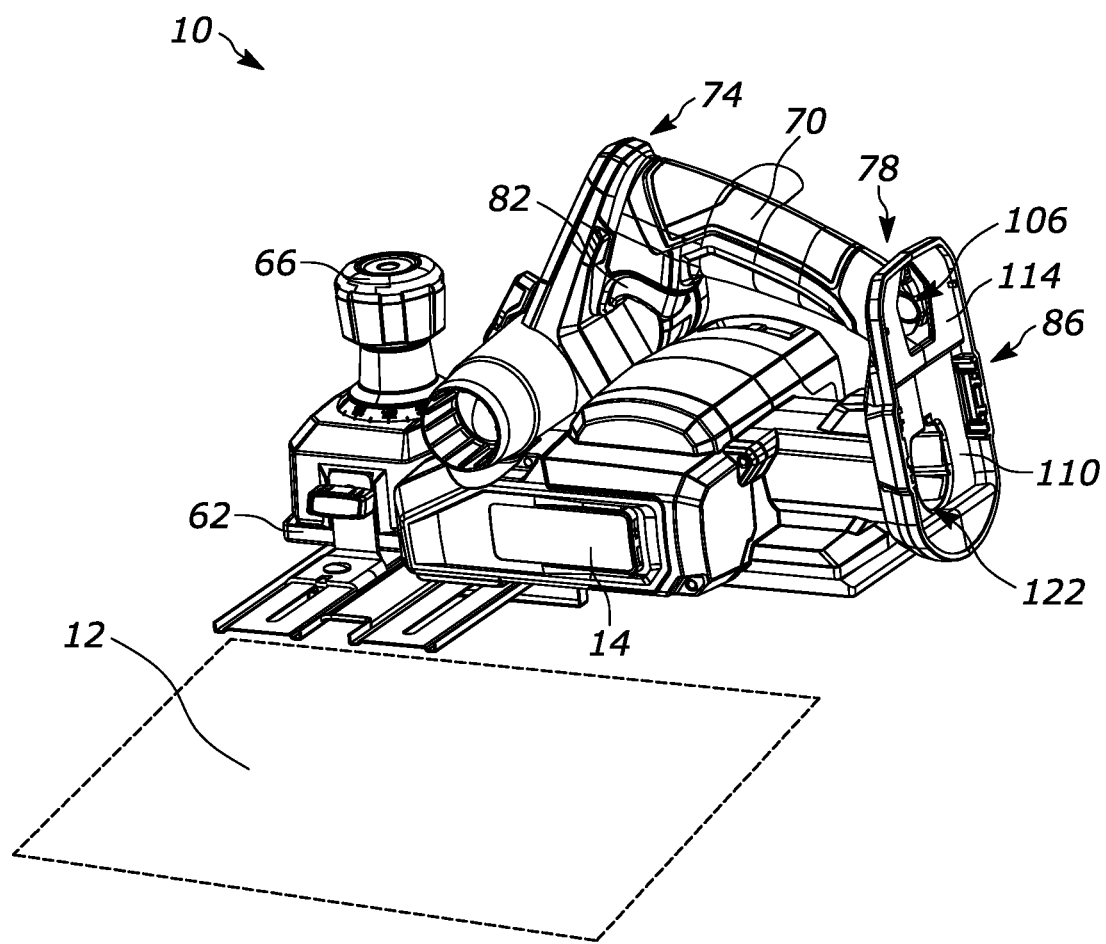
FIG. 1 is a perspective view of a power tool according to an exemplary embodiment of the disclosure.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

The detailed description uses numerical and letter designations to refer to features in the drawings. Like or similar designations in the drawings and description have been used to refer to like or similar parts of the invention.

The singular forms "a," "an," and "the" include plural references unless the context clearly dictates otherwise. The terms "coupled," "fixed," and the like refer to both direct coupling or fixing, as well as indirect coupling or fixing through one or more intermediate components or features, unless otherwise specified herein. As used herein, the terms "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive- or and not to an exclusive- or. For example, a condition A or B is satisfied by any one of the following: A is true (or present) and B is false (or not present), A is false (or not present) and B is true (or present), and both A and B are true (or present).

Benefits, other advantages, and solutions to problems are described below with regard to specific embodiments. However, the benefits, advantages, solutions to problems, and any feature(s) that may cause any benefit, advantage, or solution to occur or become more pronounced are not to be construed as a critical, required, or essential feature of any or all the claims.

FIG. 1 illustrates a power tool 10 in the form of a planer tool. The power tool 10 may be used to sufficiently level, or flatten, a workpiece or surface 12 to remove undesired bumps or protrusions in the surface 12. As persons having skill in the art will recognize, however, the power tool 10 may be in the form of any other type of power tool 10 (e.g., a sander, an oscillating tool, a file, a saw, and/or the like).

Figure 2:
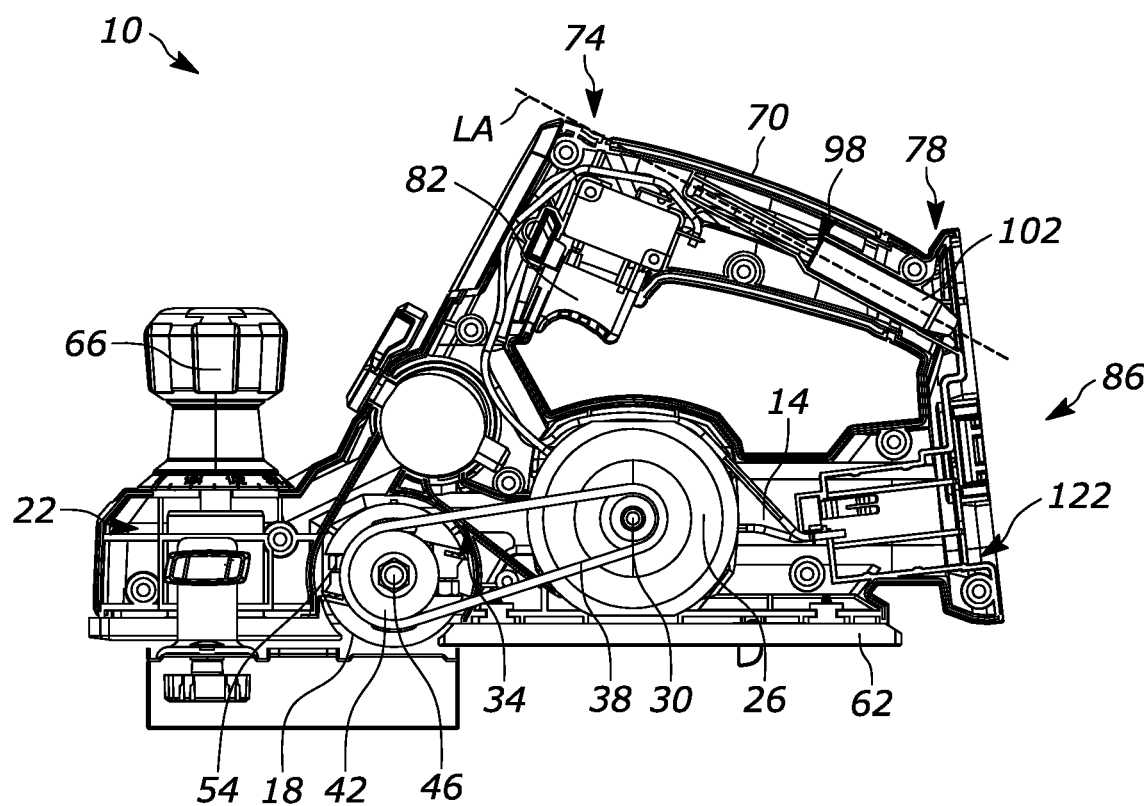
FIG. 2 is a cross-sectional view of the power tool of FIG. 1 including a storage space.

As illustrated in FIG. 2, the power tool 10 may include a housing 14, a working implement, such as a blade element 18, and an optional adjustment mechanism 22. The working implement may be in the form of a saw blade, a sanding pad, and/or the like, for example, where the power tool 10 is another type of power tool that is not a planer. The housing 14 is configured to support a motor 26 that is operably coupled to an output shaft 30. The output shaft 30 drives a transmission 34 that includes a drive belt 38 and a driven pulley 42. Specifically, rotation of the output shaft 30 drives the drive belt 38 to drive rotation of the driven pulley 42. In turn, rotation of the driven pulley 42 drives rotation of a drive shaft 46 operably coupled to the blade element 18 to drive rotation of the blade element 18. Rotation of the blade element 18 may perform a cutting action on the workpiece or surface 12 (FIG. 1). The blade element 18 may receive one or more blade inserts 54 for use in performing a cutting operation. The blade element 18 may extend through a footplate 62 of the power tool 10 to engage the workpiece or surface 12 (FIG. 1). The adjustment mechanism 22 may include an adjustment knob 66. The adjustment knob 66 is actuatable to adjust a cutting depth of the blade element 18.

Figures 3A, 3B:
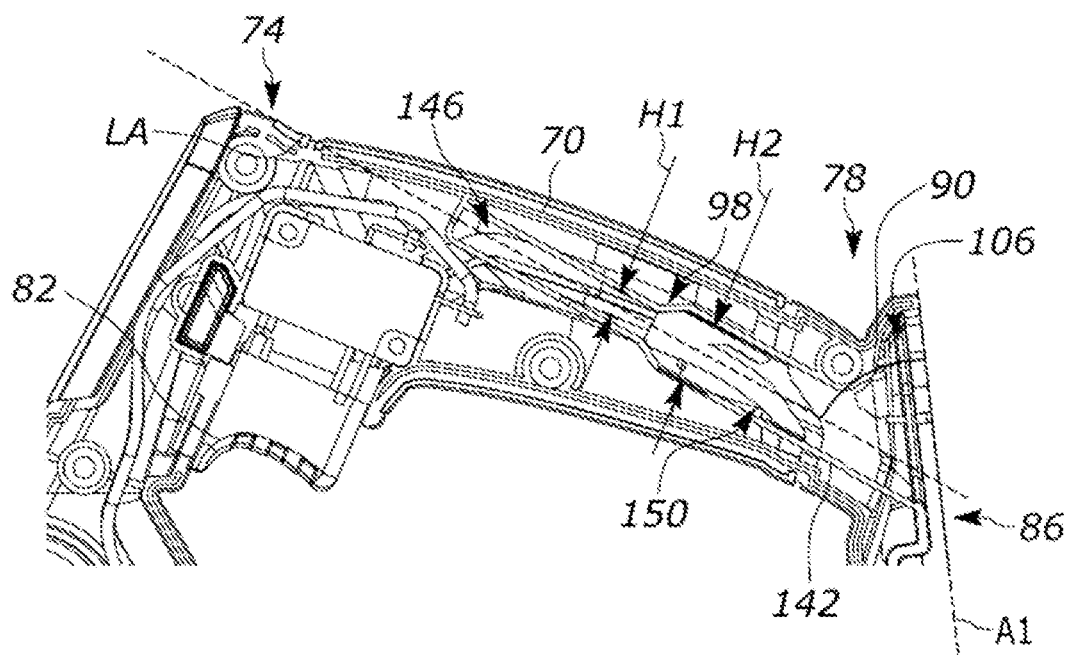
FIG. 3A is a cross-section view of the power tool including a handle and illustrating a first plane.
FIG. 3B is a cross-section view of the power tool including a tool accessory disposed in the handle and illustrating a second plane.

FIGS. 3A and 3B illustrate that the housing 14 includes a handle 70 that has a first or forward end 74, and a second or rearward end 78. The handle 70 may extend transversely to the output shaft 30 of the motor 26. The first end 74 may support an actuator 82 that is actuatable to drive rotation of the motor 26 (FIG. 2). A battery receptacle 86 is disposed adjacent to the handle 70 at the rearward end 78. The battery receptacle 86 may receive a battery pack 94 (FIG. for supplying power to the power tool 10 (FIG. 1). Notably, the handle 70 defines a storage space 98 that is accessible from the rearward end 78 for supporting at least one tool accessory 102 (e.g., a wrench or other tool). The storage space 98 is defined within the handle 70 such that the storage space 98 may also be referred to as an internal storage space. In this way, the power tool 10 may advantageously obviate the need for storage or carrying accessories in a separate accessory case, which may contribute to easier access to the tool accessory 102 and more efficient changeout of the blade inserts. The storage space 98 is internal to or in the handle 70 and differs from a storage location located on the handle 70 or another exterior part of the housing 14.

The storage space 98 includes a storage opening 106 that is cooperatively defined by the battery receptacle 86 and the handle 70. The storage opening 106 faces, or opens, perpendicularly away from a plane Al defined by the battery receptacle 86. As shown, the storage space 98 extends from the storage opening 106 into the handle 70 along a longitudinal axis LA. That is, the longitudinal axis LA extends along a center of the storage space 98. The storage space 98 may extend partially between the first end 74 and the rearward end 78 of the handle 70. The battery receptacle 86 may be oriented at an angle 90 relative to the longitudinal axis LA of the storage space 98. In the illustrated embodiment, the angle 90 is between approximately 0 and 90 degrees (approximately meaning +/− 5 degrees) such that the longitudinal axis LA extends transverse to the battery receptacle 86. The angle 90 may be between approximately 20 and 70 degrees. In some embodiments, the angle 90 may be exactly degrees.

Figure 4:
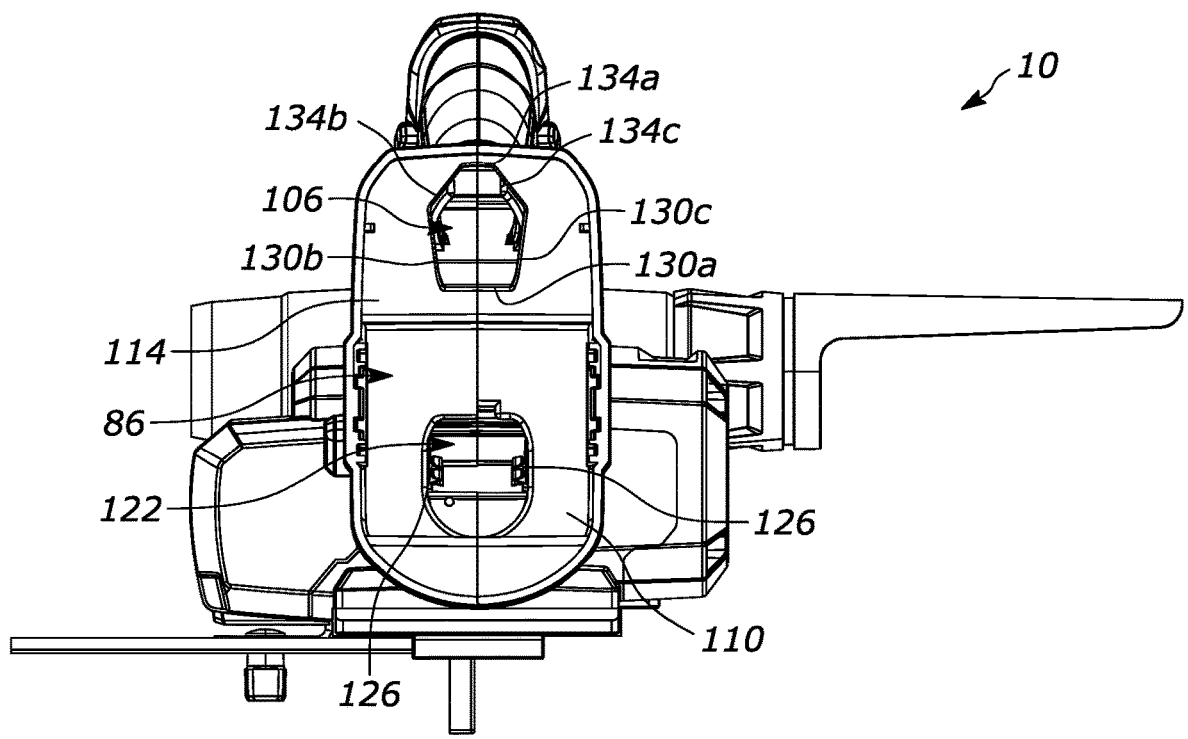
FIG. 4 is a rear view of the power tool of FIG. 1.
Figure 5:
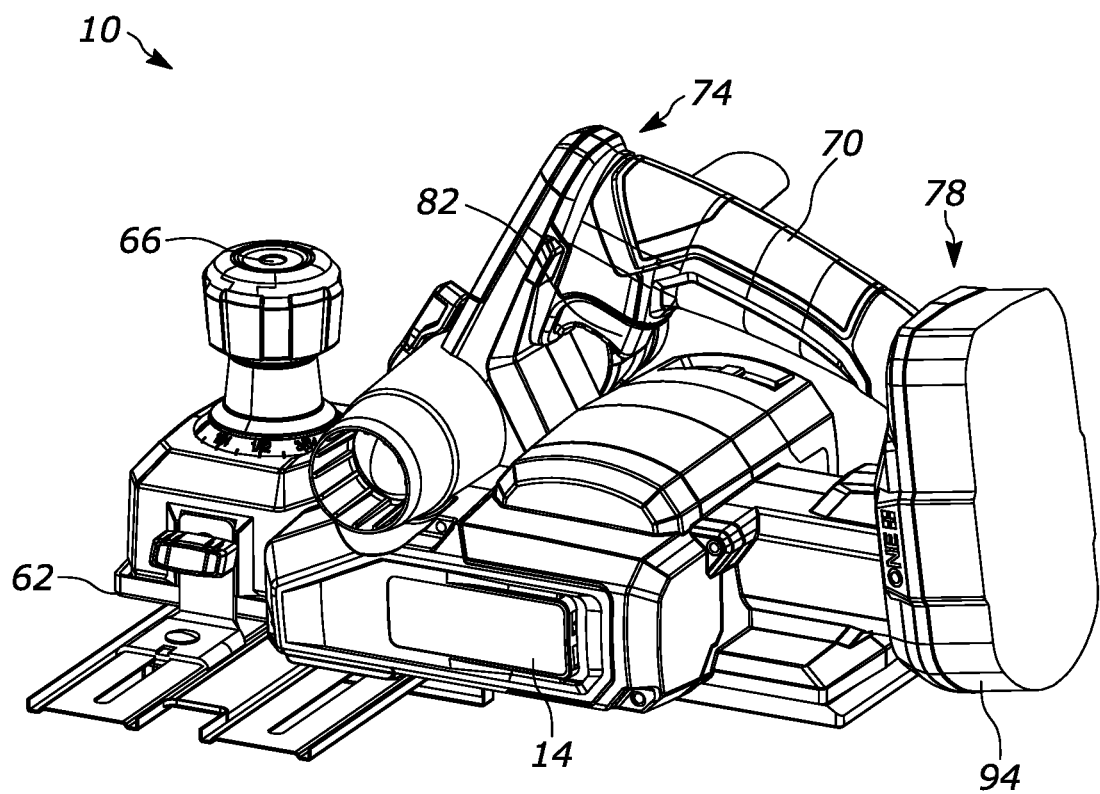
FIG. 5 is a perspective view of the power tool of FIG. 1 including a battery pack.

As illustrated in FIGS. 4 and 5, the battery receptacle 86 includes a first surface 110 and a second surface 114. The first surface 110 is recessed from the second surface 114. The first surface 110 defines an electrical aperture 122 that has electrical coupling components 126 to connect to a battery pack 94 for power supply. The storage opening 106 of the storage space 98 (FIG. 3A) is defined by the second surface 114. When the battery pack 94 is attached to the battery receptacle 86, the battery pack 94 covers the first surface 110 and the second surface 114. As such, the battery pack 94 covers the storage opening 106 to the storage space 98 (FIG. 3A) when the battery pack 94 is attached to the battery receptacle 86. In other words, when the battery pack 94 is attached to the battery receptacle 86, the battery pack 94 covers or encloses the storage space 98 (FIG. 3A). As such, the storage space 98 may only be accessible when the power tool 10 is not in use (when the battery pack 94 is detached).

Figure 6:
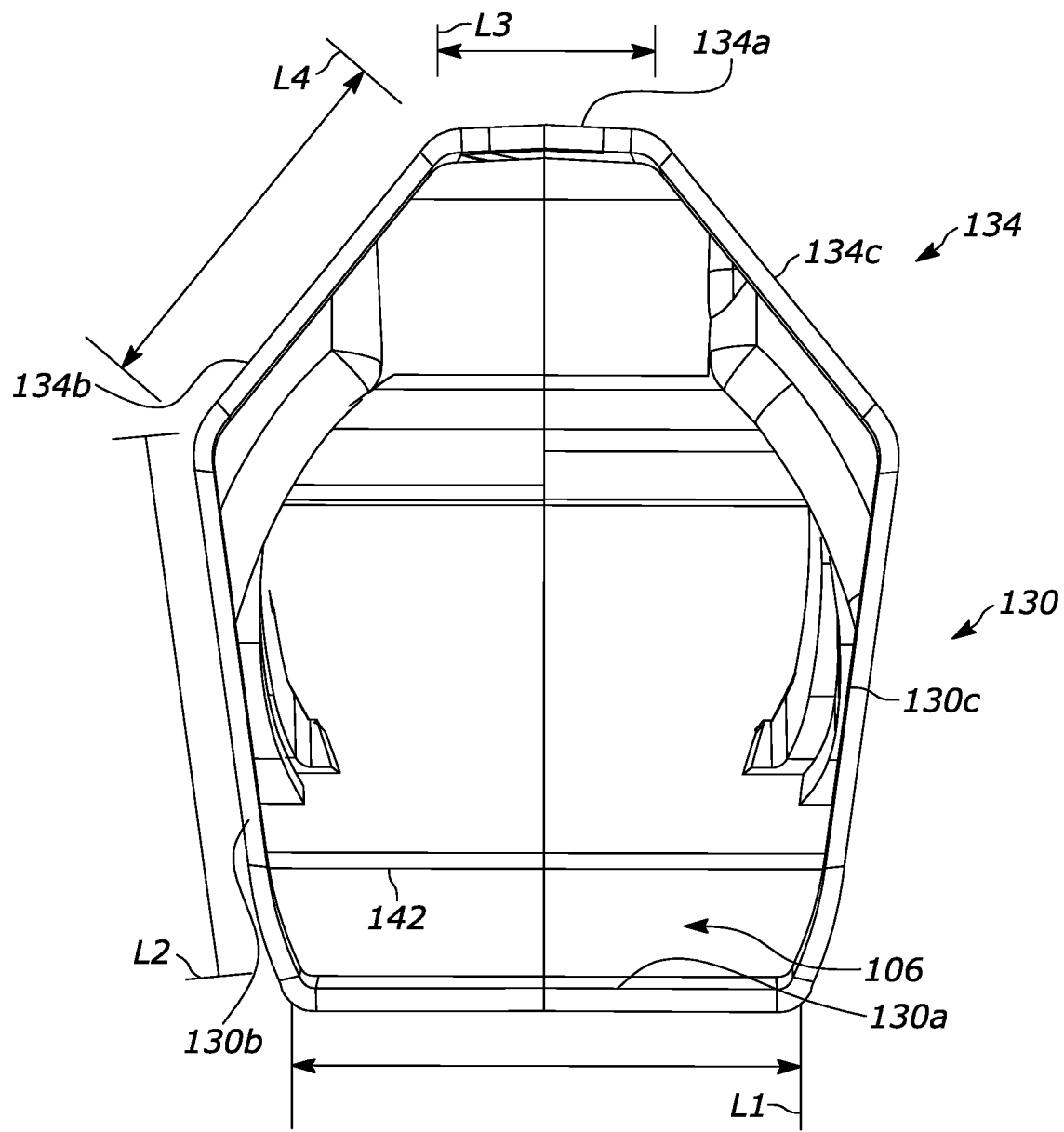
FIG. 6 is an enlarged rear view of the power tool of FIG. 4 that is perpendicular to the first plane of FIG. 3A.

In the illustrated embodiment, and as best illustrated in FIG. 6, the storage opening 106 is generally hexagonal although other shapes are possible and considered herein. The storage opening 106 includes a first group of edges 130 and a second group of edges 134. The first group of edges 130 define a portion of the storage opening 106 that is larger in area than a portion of the storage opening 106 defined by the second group of edges 134. As such, the storage opening 106 advantageously improves ease of access for a user. For example, the shape of the storage opening 106 may improve user ability to remove the tool accessory 102. Specifically, the shape of the storage opening 106 is sized such that a user may fit a finger within the storage opening 106 while the tool accessory 102 (FIG. 3B) is positioned within the storage space 98 (FIG. 3B). The storage opening 106 may also enable a user to insert into the storage space 98 multiple tool accessories 102 (FIG. 3B) and/or different types of tool accessories 102 having varying sizes.

The first group of edges 130 has three edges 130a, 130b, 130c. The three edges 130a, 130b, 130c of the first group of edges 130 include a horizontal edge 130a and two diagonal edges 130b, 130c. The second group of edges 134 also has three edges 134a, 134b, 134c. The three edges 134a, 134b, 134c of the second group of edges 134 also include a horizontal edge 134a and two diagonal edges 134b, 134c. The horizontal edge 130a of the first group of edges 130 has a first length L1. The diagonal edges 130b, 130c of the first group of edges 130 have a second length L2. In the illustrated embodiment, the second length L2 is greater than the first length L1. In addition, the horizontal edge 134a of the second group of edges 134 has a third length L3. The diagonal edges 134b, 134c of the second group of edges 134 have a fourth length L4. In the illustrated embodiment, the fourth length L4 is greater than the third length L3. Each of the edges 130a, 130b, 130c in the first group of edges 130 has a length that is greater than a length of a corresponding edge 134a, 134b, 134c in the second group of edges 134. Specifically, the first length L1 is greater than the third length L3, and the second length L2 is greater than the third length L3.

Figure 7:
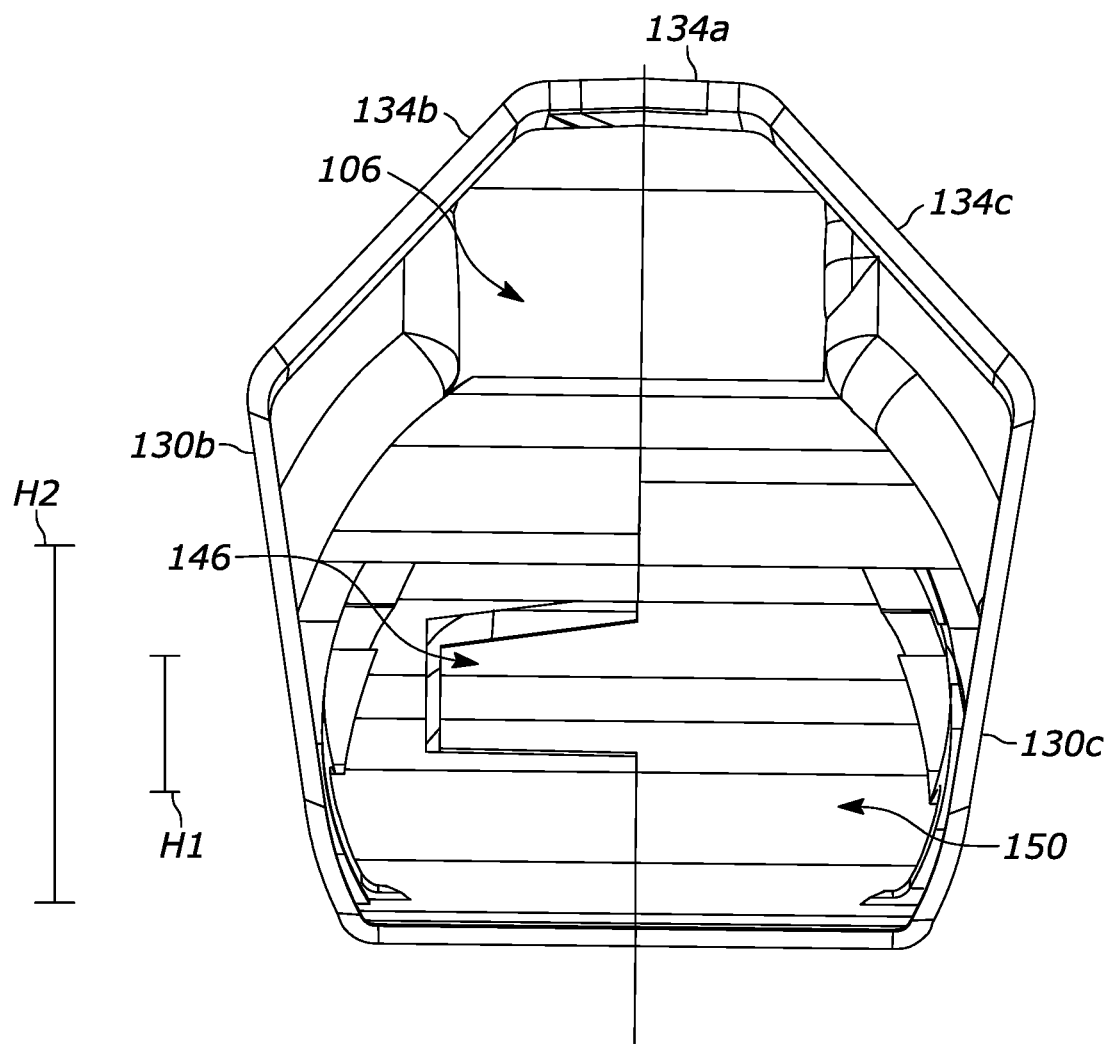
FIG. 7 is an enlarged rear view of the power tool that is perpendicular to the second plane of FIG. 3B.
Figure 8:
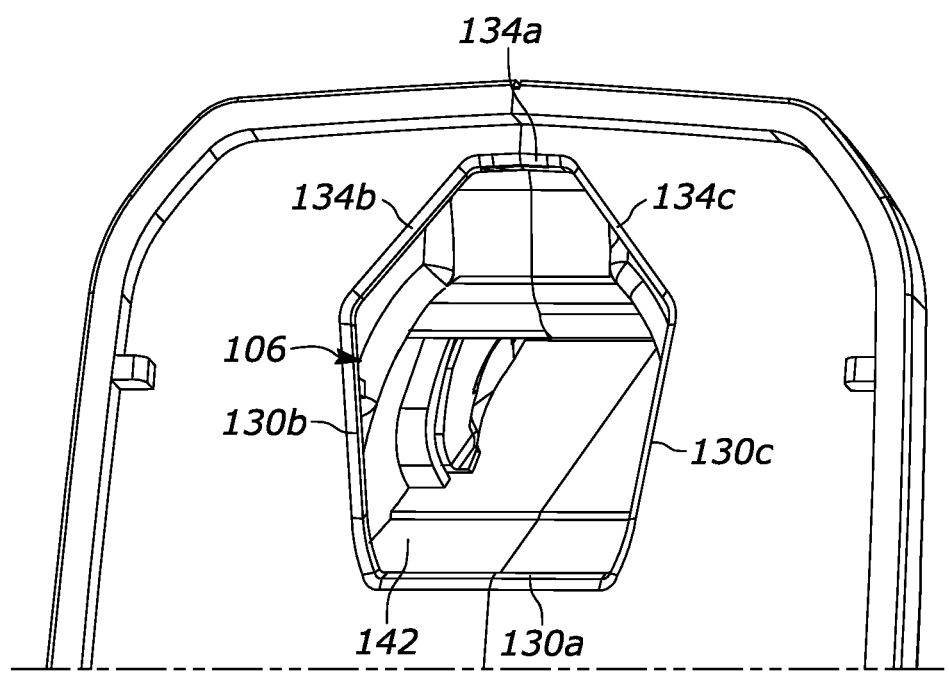
FIG. 8 is an enlarged perspective view of the power tool of FIG. 4.

With reference to FIGS. 3A and 8, the handle 70 also includes a ramped surface 142 that extends from the storage opening 106 parallel to the longitudinal axis LA of the storage space 98. The ramped surface 142 extends at least partially into the storage space 98. Returning to FIGS. 3A and 3B, the storage space 98 includes a first region 146 and a second region 150 that is positioned between the first region 146 and the storage opening 106. The ramped surface 142 extends from the storage opening 106 to the first region 146. The first region 146 may have a first height H1 and the second region 150 may have a second height H2 that is larger than the first height Hl. As shown in FIG. 7, the first region 146 may include a first cross-section (e.g., a substantially rectangular cross-section) taken across the longitudinal axis LA and the second region 150 may include a second cross-section (e.g., a substantially trapezoidal cross-section) taken across the longitudinal axis LA and. Other sizes and/or shapes associated with the storage space 98 are contemplated. In the illustrated embodiment, the opening 106 has cross-section that is greater in area than the first cross-section of the first region 146 and the second cross-section of the second region 150.

Figure 9:
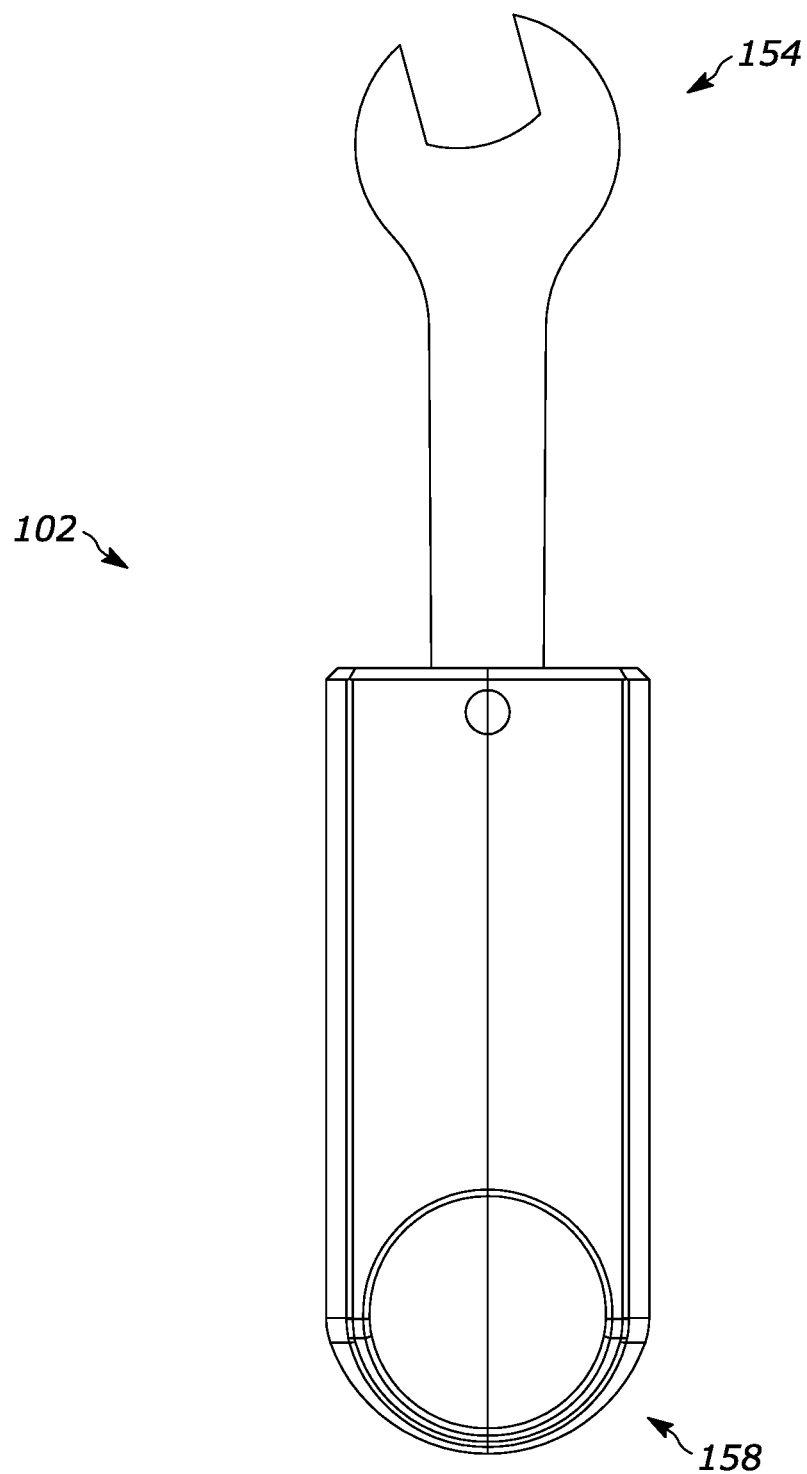
FIG. 9 is a view of the tool accessory of FIG. 3B.

With reference to FIGS. 3B and 9, the first region 146 receives and supports a work end 154 of the tool accessory 102, and the second region 150 receives and supports a handle end 158 of the tool accessory 102. The tool accessory 102 may be inserted by inserting the tool accessory 102 through the first opening 106 and sliding the tool accessory 102 along the ramped surface 142. After insertion, the handle end 158 of the tool accessory 102 may engage the second region 150 of the storage space 98 to frictionally inhibit the tool accessory 102 from falling out of the storage space 98.

As illustrated in FIG. 9, in some cases the tool accessory 102 is a crescent wrench that has the work end 154 and the handle end 158. The crescent wrench may be used for, among other applications, tightening or loosening the blade inserts 54 to the blade element 18 of FIG. 2. In some embodiments, the tool accessory 102 may be another tool or accessory (e.g., a screwdriver, a pencil, a hex key, and/or the like) for use with the power tool 10.

With reference to FIGS. 3A and 3B, the tool accessory 102 may be inserted into the storage space 98 when the battery pack 94 is detached from the power tool 10. The battery pack 94 may then be attached to the battery receptacle 86 to provide power to the power tool 10. In the installed position, the battery pack 94 (FIG. 5) covers the storage opening 106 to the storage space 98 such that the tool accessory 102 is enclosed by the battery pack 94 (FIG. 5). With the battery pack 94 (FIG. 5) attached to the battery receptacle 86, the actuator 82 may be actuated to drive the motor 26 to drive the blade element 18. After extended use or under wear conditions, the blade inserts 54 may be removed from the blade element 18 for maintenance. More specifically, the actuator 82 may be released to stop rotation of the motor 26 and the blade element 18. The battery pack 94 (FIG. 5) may be removed from the battery receptacle 86 to expose the storage space 98 and provide access to the tool accessory 102. The tool accessory 102 may then be removed from the storage space 98 and, as an example, used to loosen the blade inserts 54 from the blade element 18 to remove the blade inserts 54 from the blade element 18 for maintenance. The location of the storage space 98 advantageously reduces the size of the power tool 10 and/or optimizes otherwise unused space on the power tool 10 by utilizing the space located inside of the handle 70 of the housing 14 rather than requiring additional storage space elsewhere on the power tool 10.

1. A power tool comprising:
a housing supporting a motor operably coupled to an output shaft, the housing including
a handle supporting an actuator, and
a battery receptacle disposed adjacent to the handle and configured to receive a battery pack,
wherein the handle defining a storage space configured to support a tool accessory and enclosed by the battery pack when the battery pack is coupled to the battery receptacle.

2. The power tool of claim 1, wherein the storage space is shaped to receive the tool accessory.

3. The power tool of claim 2, wherein the battery pack is removable to expose the storage space.

4. The power tool of claim 1, wherein the battery receptacle defines a plane, and wherein the storage space extends at an angle between 20 and 70 degrees relative to the plane.

5. The power tool of claim 4, wherein the storage opening is located on the plane.

6. The power tool of claim 1, wherein the storage space includes a first region and a second region, and wherein the first region has a smaller height than the second region.

7. The power tool of claim 6, wherein the first region has a first cross-section and the second region has a second cross-section, the second cross-section having a different sectional shape than the first cross-section.

8. The power tool of claim 7, wherein the storage opening has a cross-section with an area that is greater than the first cross-section and the second cross-section.

9. A power tool comprising:
a housing supporting a motor operably coupled to an output shaft, the housing including
a handle having a first end and a rearward end, and
a battery receptacle disposed adjacent to the rearward end of the handle,
wherein the handle defines a storage space accessible from the rearward end and configured to support a tool accessory; and
wherein the battery receptacle at least partially defines an opening of the storage space.

10. The power tool of claim 9, wherein the storage space has at least one cross-sectional shape, and wherein an area of the opening is greater than the at least one cross-sectional shape of the storage space.

11. The power tool of claim 10, wherein the housing includes a ramped portion extending at least partially into the storage space from the opening.

12. The power tool of claim 9, wherein the battery receptacle defines a plane, and wherein the storage space extends at an angle between 20 and 70 degrees relative to the plane.

13. The power tool of claim 9, further comprising a battery pack selectively attachable to and detachable from the battery receptacle, wherein the battery pack is configured to enclose the tool accessory in the storage space when the battery pack is attached to the battery receptacle.

14. The power tool of claim 9, wherein the opening includes a first group of edges and a second group of edges, each of the first group of edges and the second group of edges having three edges, each of the edges in the first group of edges having a length that is greater than a length of a corresponding edge in the second group of edges.

15. The power tool of claim 9, wherein the battery receptacle includes a first surface and a second surface recessed from the first surface, and wherein the first surface defines the opening of the storage space.

16. The power tool of claim 16, wherein the second surface at least partially defines an aperture configured to support a portion of a battery pack.

17. A power tool comprising:
a housing supporting a motor operably coupled to an output shaft, the housing including
a handle, wherein:
the handle defines an internal storage space accessible from an end of the handle, and
the handle is configured to support a tool accessory in the internal storage space.

18. The power tool of claim 17, wherein the housing includes a battery receptacle disposed adjacent to the handle and wherein the storage space is enclosed by a battery pack connected to the battery receptacle.

19. The power tool of claim 17, wherein the battery receptacle defines a plane, wherein the internal storage space extends along an axis, and wherein the axis is oriented at an acute angle relative to the plane.

20. The power tool of claim 17, wherein the internal storage space is defined by a first region having a first height and a second region that has a second height different from the first height.

While the disclosure has been presented with respect to a limited number of embodiments, those skilled in the art, having benefit of this disclosure, will appreciate other embodiments may be devised which do not depart from the scope of the present disclosure. Accordingly, the scope of the invention should be limited only by the attached claims.

The invention claimed is:

1. A power tool comprising:
a housing supporting a motor operably coupled to an output shaft, the housing including
a handle supporting an actuator, and
a battery receptacle disposed adjacent to the handle and configured to receive a battery pack,
wherein the handle defines a storage space configured to support a tool accessory, the storage space being enclosed by the battery pack when the battery pack is coupled to the battery receptacle,
wherein the battery receptacle defines a plane, and wherein the storage space extends at an angle between 20 and 70 degrees relative to the plane.

2. The power tool of claim 1, wherein the storage space is shaped to receive the tool accessory.

3. The power tool of claim 2, wherein the battery pack is removable to expose the storage space.

4. The power tool of claim 1, wherein an opening of the storage space is located on the plane.

5. The power tool of claim 1, wherein the storage space includes a first region and a second region, and wherein the first region has a smaller height than the second region.

6. The power tool of claim 5, wherein the first region has a first cross-section and the second region has a second cross-section, the second cross-section having a different sectional shape than the first cross-section.

7. The power tool of claim 6, wherein an opening of the storage space has a cross-section with an area that is greater than the first cross-section and the second cross-section.

8. A power tool comprising:
a housing supporting a motor operably coupled to an output shaft, the housing including
a handle having a first end and a rearward end, and
a battery receptacle disposed adjacent to the rearward end of the handle,
wherein the handle defines a storage space accessible from the rearward end; and
wherein the battery receptacle at least partially defines an opening of the storage space, and
wherein the battery receptacle includes a first surface and a second surface recessed from the first surface, and wherein the first surface defines the opening of the storage space.

9. The power tool of claim 8, wherein the storage space has at least one cross-sectional shape, and wherein the opening has a cross-section with an area that is greater than the at least one cross-sectional shape of the storage space.

10. The power tool of claim 9, wherein the housing includes a ramped portion extending at least partially into the storage space from the opening.

11. The power tool of claim 8, wherein the battery receptacle defines a plane, and wherein the storage space extends at an angle between 20 and 70 degrees relative to the plane.

12. The power tool of claim 8, further comprising a battery pack selectively attachable to and detachable from the battery receptacle, wherein the battery pack is configured to enclose a tool accessory in the storage space when the battery pack is attached to the battery receptacle.

13. The power tool of claim 8, wherein the opening includes a first group of edges and a second group of edges, each of the first group of edges and the second group of edges having three edges, each of the edges in the first group of edges having a length that is greater than a length of a corresponding edge in the second group of edges.

14. The power tool of claim 8, wherein the second surface at least partially defines an aperture configured to support a portion of a battery pack.

15. A power tool comprising:
a housing supporting a motor operably coupled to an output shaft, the housing including a handle, wherein:
the handle defines an internal storage space accessible from an end of the handle, and
the handle is configured to support a tool accessory in the internal storage space.

16. The power tool of claim 15, wherein the housing includes a battery receptacle disposed adjacent to the handle and wherein the storage space is enclosed by a battery pack connected to the battery receptacle.

17. The power tool of claim 15, wherein the battery receptacle defines a plane, wherein the internal storage space extends along an axis, and wherein the axis is oriented at an acute angle relative to the plane.

18. The power tool of claim 15, wherein the internal storage space is defined by a first region having a first height and a second region that has a second height different from the first height.

* * * * *